(12) United States Patent
Jones et al.

(10) Patent No.: US 8,777,289 B2
(45) Date of Patent: Jul. 15, 2014

(54) APPARATUS ATTACHMENT SYSTEM

(75) Inventors: Davey Joe Jones, Vonore, TN (US);
Gordon Dale Cooley, Morristown, TN (US); Ray Miller, Vonore, TN (US);
Jimmy Akins, Vonore, TN (US)

(73) Assignee: CVG Management Corporation, New Albany, OH (US)

( * ) Notice: Subject to any disclaimer, the term of this patent is extended or adjusted under 35 U.S.C. 154(b) by 183 days.

(21) Appl. No.: 13/408,561

(22) Filed: Feb. 29, 2012

(65) Prior Publication Data
US 2013/0093234 A1 Apr. 18, 2013

Related U.S. Application Data

(60) Provisional application No. 61/548,495, filed on Oct. 18, 2011.

(51) Int. Cl.
*B60N 2/02* (2006.01)
*A47C 9/00* (2006.01)
*B60N 2/24* (2006.01)
*B60N 2/005* (2006.01)
*B60N 2/015* (2006.01)

(52) U.S. Cl.
CPC .............. *B60N 2/005* (2013.01); *A47C 9/002* (2013.01); *B60N 2/242* (2013.01); *B60N 2/015* (2013.01)

USPC .................... 296/65.13; 410/104; 244/122 R; 248/429

(58) Field of Classification Search
CPC .......... B60N 2/005; B60N 2/06; B60N 2/062
USPC .................... 296/65.13, 65.03; 410/104, 105; 244/122 R; 248/429
See application file for complete search history.

(56) References Cited

U.S. PATENT DOCUMENTS 5,137,403 A * 8/1992 McCaffrey ...................... 410/51
2009/0243326 A1 * 10/2009 Kimata et al. .............. 296/65.15

* cited by examiner

*Primary Examiner* — Joseph Pape
(74) *Attorney, Agent, or Firm* — Kegler Brown Hill & Ritter; James J. Pingor (57) ABSTRACT

A seat anchoring system that anchors seats in a seating arrangement in a vehicle is provided. The seat anchoring system includes a base and multiple fastening devices, where the fastening devices are attached to the base and extend away from an upper face of the base. The base has a shape similar to an inside configuration of a mounting rail such that the base is inserted into the mounting rail and positioned to any desirable location along the mounting rail. Further, the fastening devices extend through the mounting rail and attach the seat to the mounting rail.

13 Claims, 8 Drawing Sheets

APPARATUS ATTACHMENT SYSTEM

CROSS-REFERENCE TO RELATED APPLICATIONS

This application claims the benefit of U.S. Provisional Patent application Ser. No. 61/548,495 entitled "FLOOR ATTACHMENT APPARATUS" and filed on Oct. 18, 2011.

ORIGIN

The innovation disclosed herein relates to seating in a vehicle and more particularly to an anchoring system to attach a seat in a vehicle such as a motor coach.

BACKGROUND

In conventional seating arrangements, such as seating arrangements in a motor coach, the seats are attached or anchored to the coach structure via rails mounted along the floor and along each side wall of the coach. The rails are channel type rails that have a slotted opening along the top (for floor mounted rails) or along a side (for side wall mounted rails). The seats are mounted to the rails using a T-shaped fastener. The T-shaped fastener is inserted into the rail via the slot at any position and rotated 90 degrees to allow the "T" portion of the fastener to engage the top (or side) wall of the rail. The seats are then fastened (with bolts) to the T-shaped fasteners thereby fastening the seats to each rail and ultimately the coach.

The T-shaped fasteners are slidable along the slotted rails and thus, allow for easy repositioning of the seats. The disadvantage, however, to using T-shaped fasteners to mount the seats to the rail of the coach is that T-shaped fasteners do not meet testing requirements of the Federal Motor Vehicle Safety Standards (FMVSS) during seat belt safety tests. In other words, in the event of a crash, the T-shaped fasteners do not prevent the seats from becoming disengaged from the floor and side rails. As a result, seat belts are not permitted in motor coach vehicles where the seat mounting system does not meet the FMVSS.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed herein, in one aspect thereof, addresses the above mentioned disadvantage and provides a seat anchoring system and method that can withstand loads and forces placed on the seat anchoring system to meet the seat belt testing requirements of the FMVSS.

The innovation disclosed and claimed herein, in another aspect thereof, comprises an anchoring system that secures an anchored structure to a mounting structure that includes a base and a plurality of fastening devices attached to the base and extending away from an upper face of the base. The base has a shape similar to an inside configuration of a mounting structure such that the base is inserted into the mounting structure and positioned to any desirable location along the mounting structure. Further, the plurality of fastening devices extend through the mounting structure and attach the anchored structure to the mounting structure.

In accordance with another aspect of the innovation, a seat anchoring system that anchors seats in a seating arrangement in a vehicle includes a base and a plurality of fastening devices attached to the base and extending away from an upper face of the base. The base has a shape similar to an inside configuration of a mounting rail such that the base is inserted into the mounting rail and positioned to any desirable location along the mounting rail. Further, the plurality of fastening devices extend through the mounting rail and attach the seat to the mounting rail.

In accordance with yet another aspect of the innovation, a method of retrofitting seats in a seating arrangement in a vehicle includes providing an anchoring system including a base and a plurality of fastening devices extending from an upper surface of the base, removing seats from mounting rails in the vehicle, cleaning the mounting rails in the vehicle, removing a portion of a floor of the vehicle behind the driver's seat to allow access to the mounting rail, inserting the base into a mounting rail such that the plurality of fastening devices extend through the mounting rail, and reinstalling the seats onto the mounting rails such that openings defined in a front and rear pedestal of the seat are aligned with the plurality of fastening devices.

In accordance with yet another aspect of the innovation the plurality of fastening devices are threaded studs integrated into the base and threaded securing devices that thread onto the threaded studs to secure the anchored structure to the mounting structure.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. Moreover, not all illustrated acts may be required to implement a methodology in accordance with the innovation.

Figure 1:
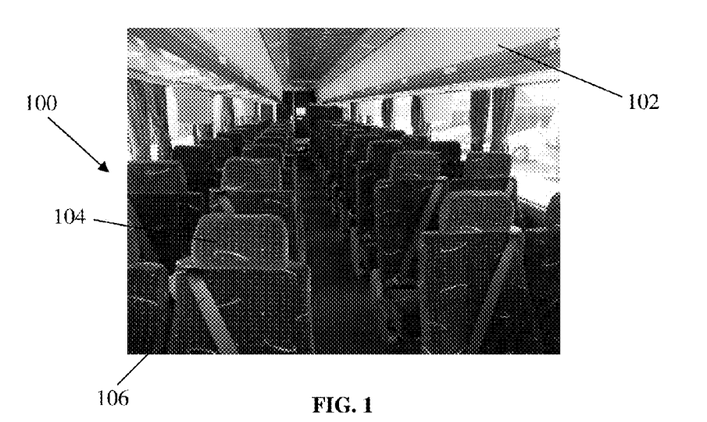
FIG. 1 illustrates an example seating arrangement in accordance with aspects of the innovation.
Figure 2A:
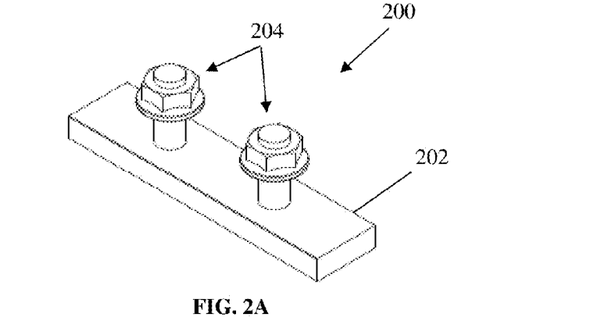
FIG. 2A illustrates a perspective view of a seat anchoring system in accordance with aspects of the innovation.

Referring now to the drawings, FIG. 1 is an example illustration of an anchored apparatus arrangement 100 incorporating an innovative apparatus anchoring system 200, as shown in FIG. 2A, in accordance with aspects of the innovation. It is to be appreciated that the apparatus illustrated in the apparatus arrangement 100 in FIG. 1 can be any type of anchored apparatus required to withstand a continual load for an extended period of time and/or a sudden impact force from any direction. For example, the apparatus arrangement system 100 may be anchored seats in a motor coach bus, an airplane, a school bus, a truck, etc. The example embodiment illustrated in FIG. 1 is a seating arrangement 100 for a motor coach bus 102 and as such, the innovation disclosed herein will be described in relation to the anchoring of seats 104 in the seating arrangement 100 of the motor coach bus 102. Thus, the example embodiment of the seating arrangement 100 of FIG. 1 is for illustrative purposes only and is not intended to limit the scope of the innovation.

Similarly, the apparatus anchoring system 200 disclosed herein can be used on any type of anchored apparatus required to withstand a continual load for an extended period of time and/or a sudden impact force from any direction similar to those mentioned above. The apparatus anchoring system 200 disclosed herein, in one aspect thereof, comprises a seat anchoring system 200 for anchoring seats 104 in the seat arrangement 100 for the motor coach bus 102 shown in FIG. 1. Thus, the example embodiment of the apparatus anchoring system 200 described herein and shown in the figures is for illustrative purposes only and is not intended to limit the scope of the innovation.

As mentioned above, conventional anchoring methods do not meet the seat belt test requirements of the FMVSS. The seat anchoring system 200 disclosed herein overcomes this disadvantage. Specifically, the seat anchoring system 200 meets the seat belt testing requirements of the FMVSS. Thus, seat belts 106, such as a 3-point seat belt system shown in FIG. 1, can be installed on new motor coach busses that employ the seat anchoring system 200 disclosed herein. In addition, the seat anchoring system 200 can be easily retrofitted onto existing seats in existing motor coach busses (as will be described further below) that originally incorporate the conventional anchoring methods described above, without the need to replace the seats. As a result, because the seat anchoring system 200 meets the seat belt testing requirements of the FMVSS, the existing seats 104 on existing motor coach busses 102 can also be retrofitted with seat belts 106.

Figure 2B:
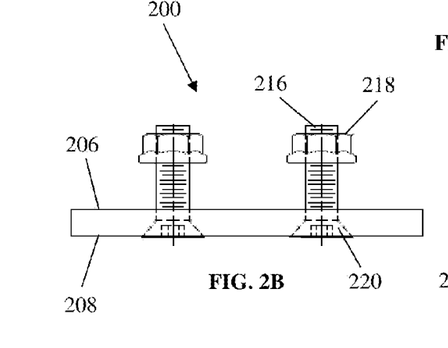
FIG. 2B illustrates a plan view of the seat anchoring system of FIG. 2A in accordance with aspects of the innovation.
Figure 2C:
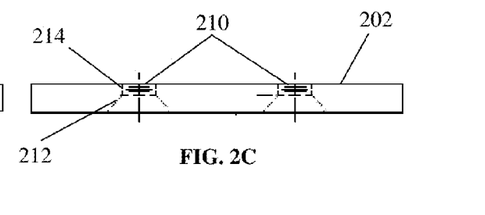
FIG. 2C illustrates a plan view of a base of the seat anchoring system of FIG. 2A in accordance with aspects of the innovation.

Referring to FIGS. 2A-2C, the seat anchoring system 200 includes a base 202 and multiple fastening devices 204. The base 202 has a shape similar to an inside configuration of a mounting rail (or structure) 504 (see FIG. 5), as will be discussed further below. The base 202 can be made from any suitable material, such as but not limited to, a high strength-low alloy steel, carbon steel, etc. The base 202 has a rectangular-block shape and includes an upper face 206, a lower face 208, and multiple apertures 210 that receive the multiple fastening devices 204. Each multiple aperture 210 includes a beveled portion 212 and a threaded portion 214.

The fastening devices 204 are used to secure the seat 104 to the mounting rail 504 once the base 202 is inserted in the mounting rail 504. The fastening devices 204 may be any type of suitable fastening device, such as but not limited to a threaded stud 216 with a threaded securing device 218 such as a bolt 216 and nut 218 combination, or the like. It is to be appreciated that in another example embodiment, the threaded stud 216 can be integrated portion of the base 202, which is also represented by FIG. 2A. For purposes of simplicity and illustration only, however, the anchoring system 200 will be described herein using the bolt 216 and nut 218 combination.

The bolt 216 has a countersunk type head 220 and is inserted into the aperture 210 from the lower face 208 of the base 202. The bolt 216 is rotated so as to advance through the threaded portion 214 of the aperture 210 until the countersunk type head 220 engages the beveled portion 212 of the aperture 210. The bolt 216 can be tightened in each aperture 210 to approximately 30-40 foot pounds (ft lbs). It is to be appreciated that the bolt 216 and nut 218 combination can be any type of suitable bolt having any type of suitable head, such as but not limited to a pan head, a hexagonal head, etc.

Figure 3:
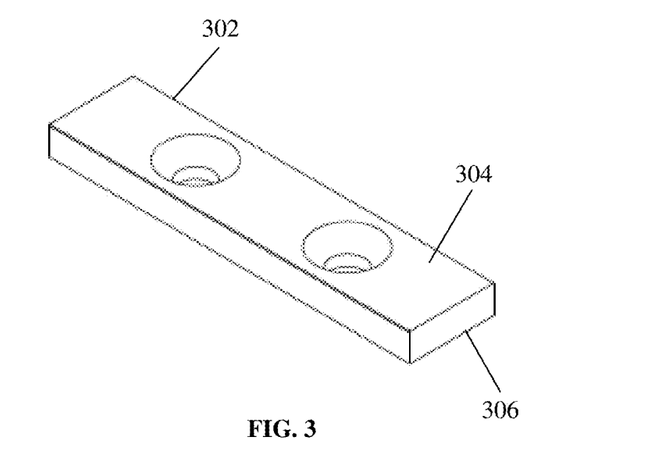
FIG. 3 illustrates a perspective view of an example embodiment of the base in accordance with aspects of the innovation.
Figure 4:
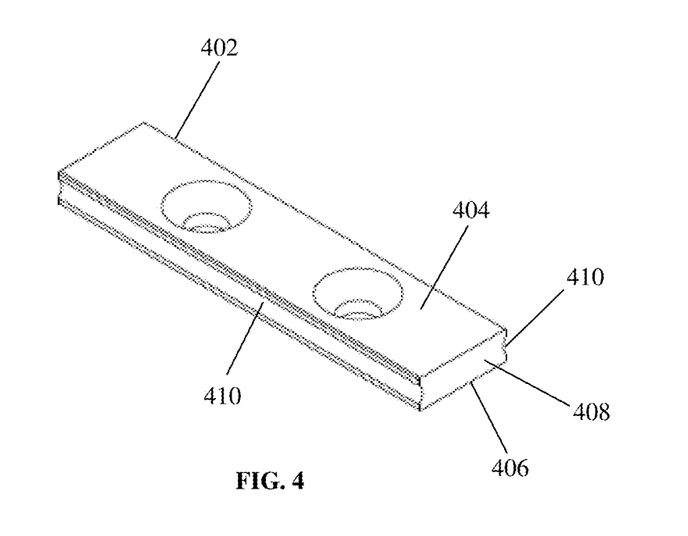
FIG. 4 illustrates a perspective view of another example embodiment of the base in accordance with aspects of the innovation.

As mentioned above, the base 202 has a shape similar to the configuration of the inside of the mounting rail 504. It is to be appreciated, however, that the base can have multiple shapes to conform to the inside configuration of the mounting rail 504. For example, FIGS. 3 and 4 illustrate two example embodiments of the base 302, 402, which are shown with the upper face 304, 404 facing downwards and the bottom face 306, 406 facing upwards. In each embodiment, the base 302, 402 has a rectangular block shape. In the example embodiment shown in FIG. 3, each face of the base 302 is generally planar. In the embodiment shown in FIG. 4, however, both the upper and lower faces 404, 406 along with each end face 408 are generally planar. The two longitudinal faces 410, however, have a concave shape. This allows the base 400 in this embodiment to be used with a mounting rail 504 having a similar inside configuration.

Figure 5:
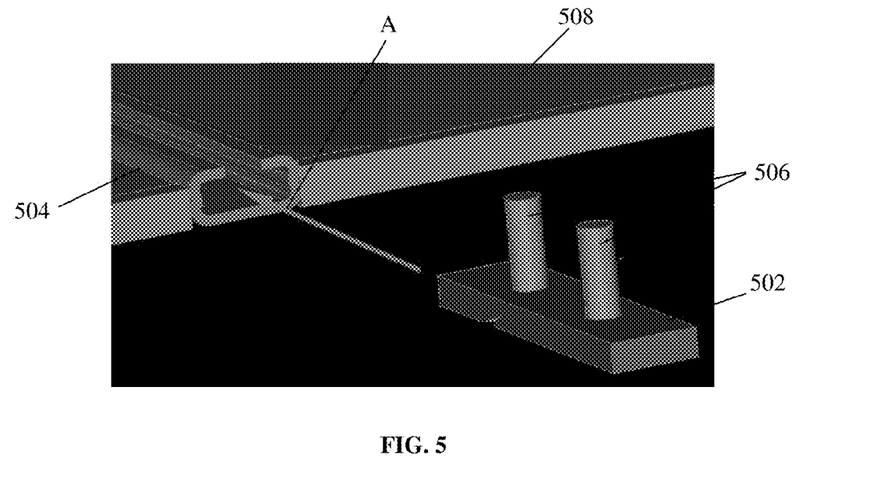
FIG. 5 illustrates a perspective view of how the seat anchoring system inserts into a mounting rail in accordance with aspects of the innovation.

FIG. 5 illustrates how the shape of the base 502 mates with the configuration of the mounting rail 504 to form a structure that meets the seat belt testing requirements of the FMVSS. Once each fastening device 506 is inserted in each aperture, the base 502 is slid into an end of the mounting rail 504 as indicated by the arrow "A." Because the shape of the base 502 is similar to the inside configuration of the mounting rail 504, the base remains inside the mounting rail 504, thereby securing the seats 104 to the motor coach structure 508, in the event of a sudden impact force to the motor coach bus 102.

Figure 6:
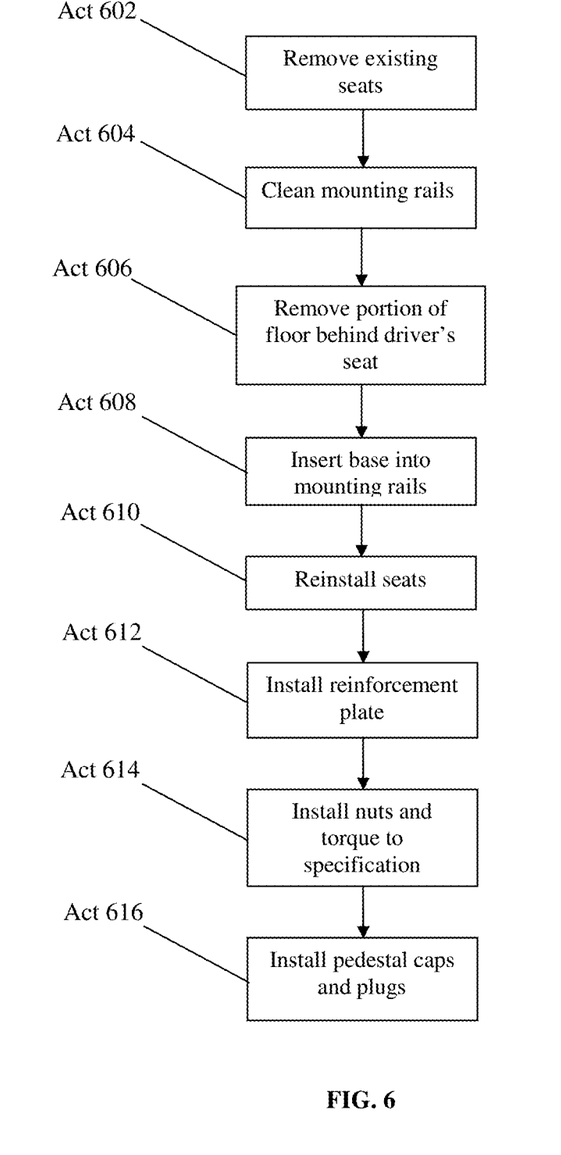
FIG. 6 illustrates a method of retrofitting seats with the seat anchoring system in accordance with aspects of the innovation.
Figure 7A:
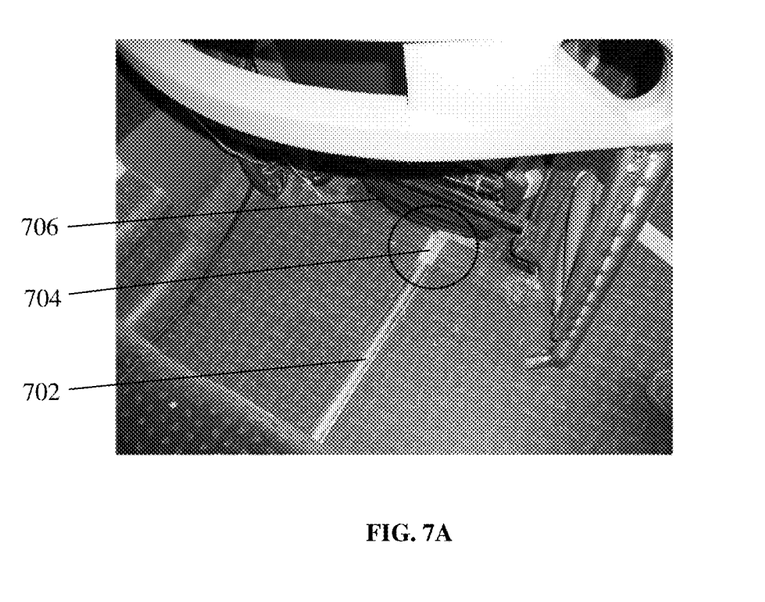
FIGS. 7A-7J illustrate the method of FIG. 6 in accordance with aspects of the innovation.
Figure 7B:
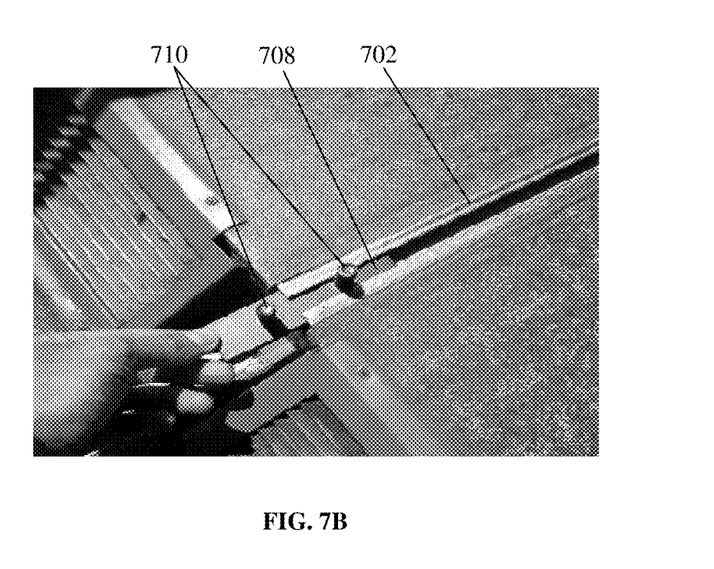
Figure 7C:
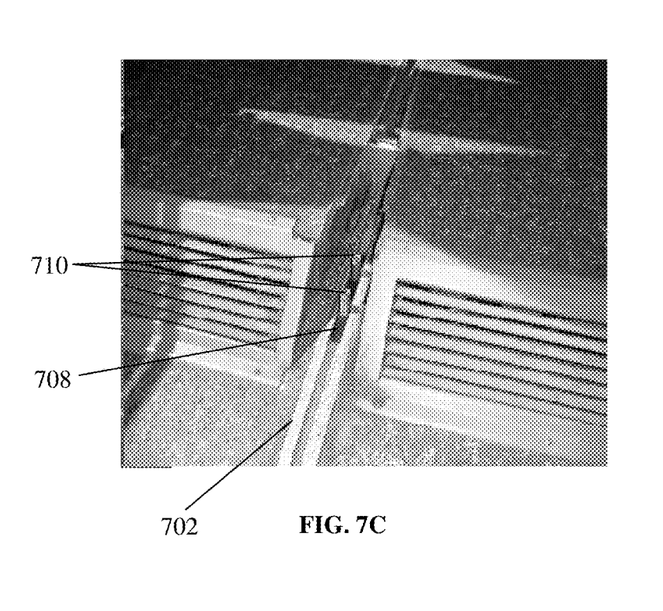
Figure 7D:
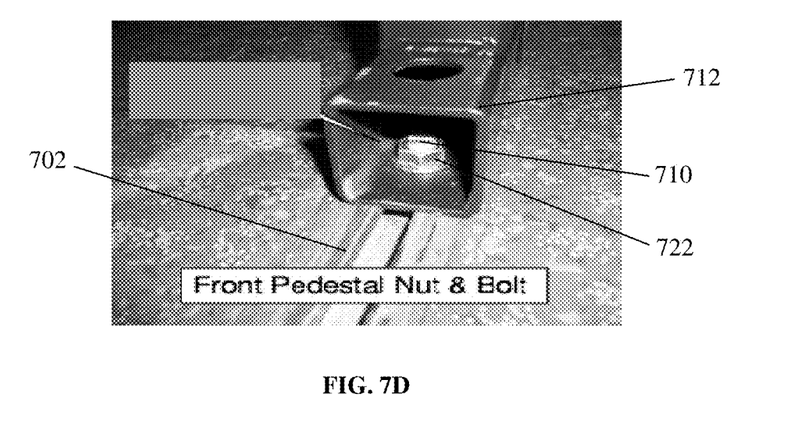
Figure 7E:
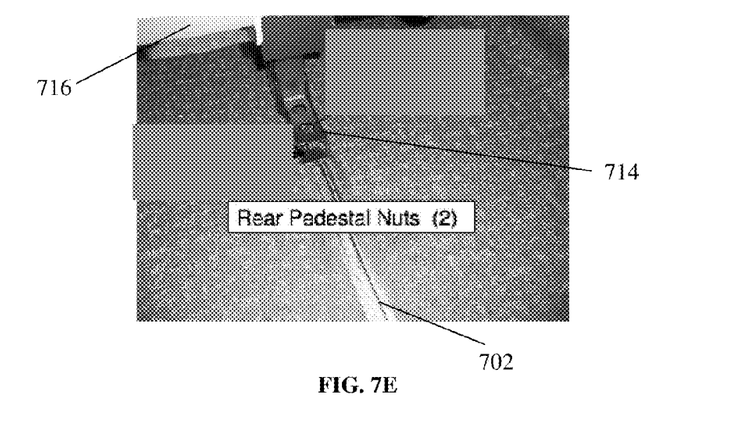
Figure 7F:
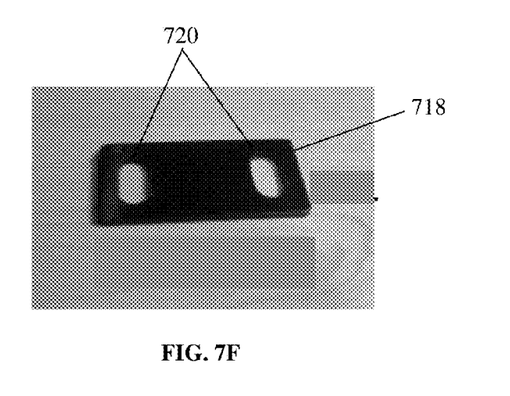
Figure 7G:
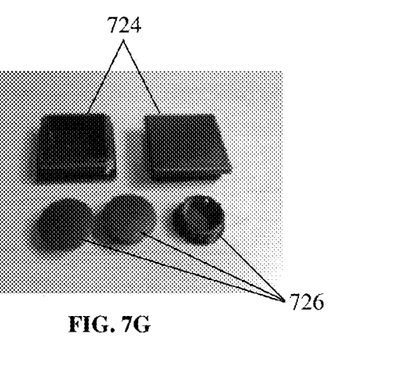
Figure 7H:
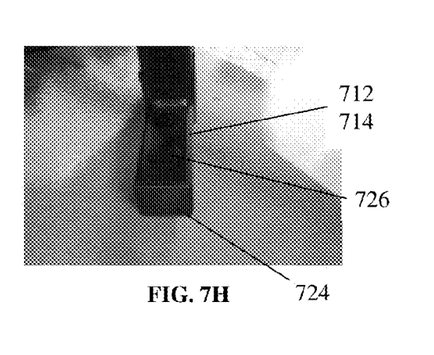
Figure 7I:
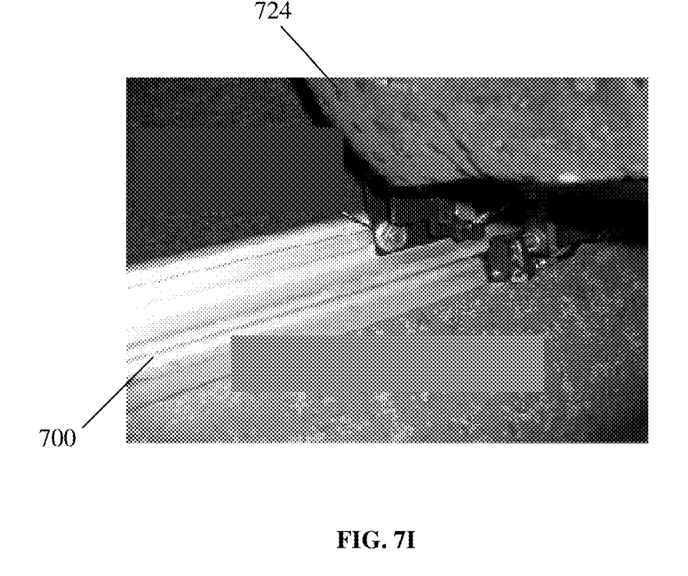
Figure 7J:
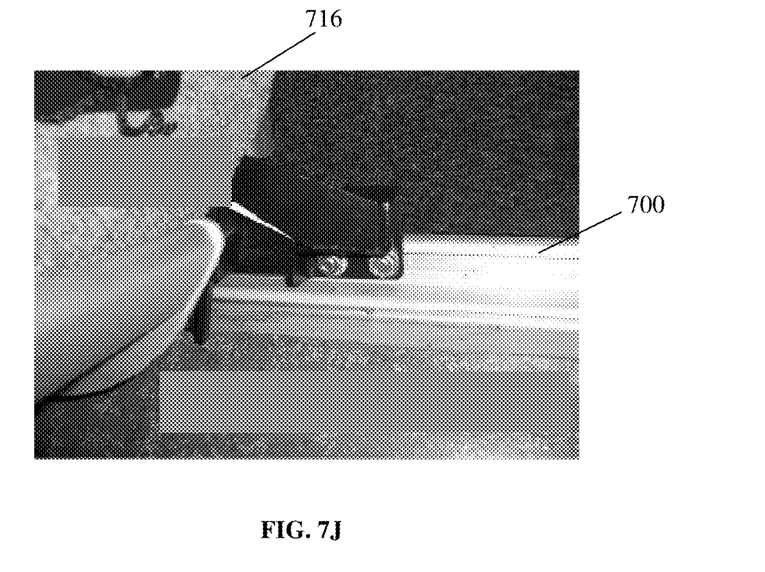

Referring to FIG. 6, a method of retrofitting existing seats in an existing motor coach with the innovation described herein will be described with reference to FIGS. 7A-7J. It is to be appreciated that although the method will be described with reference to a floor mounting rail, a similar method also applies to side wall mounting rails 700, which are shown in FIGS. 7I and 7J.

At Act 602, existing seats in an existing motor coach are removed. At Act 604, the mounting rails 702 are cleaned and degreased. In addition, all debris must be removed from the mounting rails to insure that the base slides unimpeded within the mounting rail without becoming jammed. At Act 606 (FIG. 7A), a portion of the floor 704 directly behind the driver's seat 706 is removed to allow access to the mounting rail 702. At Act 608 (FIGS. 7B and 7C), the base 708, including the bolts 710 of each fastening device, is inserted into the mounting rail 702 and positioned at the appropriate location along the mounting rail 702. One base 708 is required for a front pedestal 712 and one base 708 is required for a rear pedestal 714 of each seat 716. At Act 610 (FIGS. 7D and 7E), the seat 716 is reinstalled such that the bolts 710 are inserted through openings in the front and rear pedestal 712, 714. If desired, at this time, the seat 716 can be repositioned to an appropriate location along the mounting rail 702. At Act 612, a reinforcement plate 718 having openings 720 is placed on the front and rear pedestal 712, 714 such that each bolt 710 is inserted through the openings 720 on the reinforcement plate 718. At Act 614, the nuts 722 are installed on the bolts 710 and are tightened according to an appropriate specification. At Act 616, pedestal caps 724 and plugs 726 (FIG. 7G) are installed on the front and rear pedestals 712, 714 (FIG. 7H).

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An anchoring system that secures an anchored apparatus to a mounting structure comprising:
    a base;
    a plurality of fastening devices attached to the base and extending away from an upper face of the base; and
    a reinforcement plate, the reinforcement plate being disposed outside the mounting structure and including openings to receive the plurality of fastening devices,
    wherein the base has a shape similar to an inside configuration of the mounting structure such that the base is inserted into the mounting structure and positioned to any desirable location along the mounting structure, and wherein the plurality of fastening devices extend through the mounting structure and attach the anchored apparatus to the mounting structure.

2. The anchoring system of claim 1, wherein the plurality of fastening devices are threaded studs integrated into the base and threaded securing devices that thread onto the threaded studs and secure the anchored apparatus to the mounting structure.

3. The anchoring system of claim 1, wherein the base has a plurality of openings extending from an upper face to a lower face, and wherein each of the plurality of fastening devices includes a threaded stud that extends through each of the plurality of openings from the lower face to the upper face of the base and a threaded securing device that threads onto the threaded stud and secures the anchored apparatus to the mounting structure.

4. The anchoring system of claim 3, wherein the plurality of openings defined in the base have a beveled portion and a threaded portion, and wherein the threaded studs thread into the threaded portion of the plurality of openings.

5. The anchoring system of claim 4, wherein the stud is a bolt having a countersunk type head and the securing device is a nut.

6. The anchoring system of claim 5, wherein the base has a rectangular shape and each face of the base is generally planar.

7. The anchoring system of claim 5, wherein the base has a rectangular shape and the upper face, the lower face and each end face of the base are generally planar and each longitudinal face has a concave shape.

8. A seat anchoring system that secures seats in a seating arrangement to a mounting rail in a vehicle comprising:
    a base; and
    a plurality of fastening devices attached to the base and extending away from an upper face of the base,
    wherein the base has a shape similar to an inside configuration of the mounting rail such that the base is inserted into the mounting rail and positioned to any desirable location along the mounting rail, and wherein the plurality of fastening devices extend through the mounting rail and attach the seat to the mounting rail,
    wherein the base has a plurality of openings extending from an upper face to a lower face,
    wherein each of the plurality of fastening devices include a threaded stud that extends through each of the plurality of openings from the lower face to the upper face of the base and a threaded securing device that threads onto the threaded stud and secures the seats to the mounting rail, and
    wherein the plurality of openings defined in the base have a beveled portion and a threaded portion.

9. The anchoring system of claim 8, wherein the threaded stud is a bolt having a countersunk type head and the threaded securing device is a nut, and wherein the bolt threads into the threaded portion of the plurality of openings until the countersunk type head engages the beveled portion and is tightened against the beveled portion.

10. The anchoring system of claim 9, wherein the base has a rectangular shape and each face of the base is generally planar.

11. The anchoring system of claim 9, wherein the base has a rectangular shape and the upper face, the lower face and each end face of the base are generally planar and each longitudinal face has a concave shape.

12. The anchoring system of claim 9 further comprising a reinforcement plate, the reinforcement plate being disposed outside the mounting rail and including openings to receive the threaded stud.

13. The anchoring system of claim 12, wherein the vehicle is a motor coach bus.

* * * * *